United States Patent [19]
Gates

[11] Patent Number: 5,206,909
[45] Date of Patent: Apr. 27, 1993

US005206909A

[54] METHOD FOR SECURE PPM-BASED LASER COMMUNICATIONS

[75] Inventor: John A. Gates, San Jose, Calif.

[73] Assignee: GTE Government Systems Corporation, Mountain View, Calif.

[21] Appl. No.: 643,250

[22] Filed: Jan. 18, 1991

[51] Int. Cl.[5] ............................................. H04L 9/00
[52] U.S. Cl. .................................................... 380/59
[58] Field of Search ........................... 380/59; 375/23; 359/152, 186

[56] References Cited

U.S. PATENT DOCUMENTS

| | | | |
|---|---|---|---|
| 4,648,133 | 3/1987 | Vilnrotter | 375/23 |
| 4,866,738 | 9/1989 | Wiesmann et al. | 375/23 |
| 4,995,101 | 2/1991 | Titterton et al. | 359/152 |
| 5,038,406 | 8/1991 | Titterton et al. | 359/152 |

Primary Examiner—Salvatore Cangialosi
Attorney, Agent, or Firm—James J. Cannon, Jr.

[57] ABSTRACT

A system for secure communication between transmitting and receiving devices in a laser communications system using pulse position modulation, has a transmitter means to modulate and a receiver means to demodulate a transmission utilizing a protocol in which a number N ($N \geq 1$) of optical pulses represents each symbol to be transmitted. A transmission is initiated with a trigger event. Thereafter, a multi-pulse synchronization signal is transmitted as the first symbol of each transmission, the first pulse of said synchronization symbol being transmitted within a first time frame after said trigger. A buffer in said receiver receives and stores the first of said N frames of said synchronization symbol. Each subsequently received frame of said N frames of said synchronization symbol is added to data previously stored in said buffer. A frame template is calculated from the stored pulse data of said first N pulses in said buffer and from said synchronization symbol protocol. The calculated frame template is used for transmission of subsequent message symbols, which are then transmitted in N frames per symbol. The system includes an algorithm for the synchronization symbol format which pseudo-randomly positions each of said $N-1$ pulses after said first pulse within its frame by offsetting the start time of its frame by a predetermined amount of time, with reference to the start time of said first frame. The system also includes an algorithm for the message symbol format which pseudo-randomly positions each of said $N-1$ pulses after said first pulse within its frame by offsetting its pulse position from that of said first frame such that the separations of said pulses vary from frame to frame within a symbol, and said algorithmically determined position of any pulse falls within the live time of its frame.

9 Claims, 5 Drawing Sheets

METHOD FOR SECURE PPM-BASED LASER COMMUNICATIONS

BACKGROUND OF THE INVENTION

This invention was made with Government support under Contract No. N68786-89-D-1661 awarded by the Department of the Navy. The Government has certain rights in this invention.

This invention pertains generally to the field of laser-based optical communication systems, and, more particularly, to a method for enhancing the transmission and reception of optical pulses, while protecting the security of the information conveyed by said pulses.

In laser communications systems, laser power is often at a premium. To best take advantage of the maximum laser power to be available in each pulse, a pulsed modulation technique is normally utilized. Because of other factors involved (i.e., the frequency with which these pulses can be generated, thermal considerations, etc.), the pulse modulation normally chosen is Pulse Position Modulation (PPM). The basis of PPM is that the information symbol to be transmitted determines the position of a transmitted pulse within some well defined, fixed time window. This time window is commonly referred to as a "frame." Often times, even though the total power available from the laser is expended in each pulse, the received energy may not be much greater than the background noise of the communications channel. In point of fact, the received signal may be at a level lower than the incoming noise. This generally yields a signal-to-noise ratio (SNR) below a level required to accurately demodulate the received pulses into their original information symbols. In fact, for security reasons, it is desirable in many cases that the received pulse energy be artificially reduced (by lowering transmitter power if required) to such a low SNR that any third party attempting to eavesdrop on a communications session will find it difficult to detect the very fact that communications are occurring at all.

Prior solutions to the problem of detecting and demodulating optical pulses in an environment with a low SNR either have required an excessive amount of hardware or have lacked effective security for the information transmitted.

SUMMARY OF THE INVENTION

A principal object of the present invention is to provide an efficient, secure method for the transmission of optical pulses.

A further object of the invention is to provide a method by which a number of individual pulses may be summed together at the receiving end of a communication link in such a way as to improve the effective SNR of the resultant summed pulse to an amount sufficient for accurate demodulation.

Still a further object of the invention is to provide a method for generating a number of pulses based upon a single information symbol for the purposes of appropriately modulating a laser.

In a first aspect of the invention, a system for secure communication between transmitting and receiving devices in a laser communications system using pulse position modulation, comprises a transmitter means to modulate and a receiver means to demodulate a transmission utilizing a protocol in which a number N (where $N \geq 1$) of optical pulses represents each symbol to be transmitted. A transmission is initiated with a trigger event. Thereafter, a multi-pulse synchronization signal is transmitted as the first symbol of each transmission, the first pulse of said synchronization symbol being transmitted within a first time frame after said trigger. A buffer in said receiver receives and stores the first of said N frames of said synchronization symbol. Each subsequently received frame of said N frames of said synchronization symbol is added to data previously stored in said buffer. A frame template is calculated from the stored pulse data of said first N pulses in said buffer and from said synchronization symbol protocol. The calculated frame template is used for reception of subsequent message symbols, which will have been transmitted in N frames per symbol.

In a second aspect of the invention, the system includes an algorithm for the synchronization symbol format which pseudo-randomly positions each of said $N-1$ pulses after said first pulse within its frame by offsetting the start time of its pulse by a predetermined amount of time, with reference to the start time of said first frame.

In a third aspect of the invention, the system also includes an algorithm for the message symbol format which pseudo-randomly positions each of said $N-1$ pulses after said first pulse within its frame by offsetting its pulse position from that of said first frame such that the separations of said pulses vary from frame to frame within a symbol, and said algorithmically determined position of any pulse falls within the live time of its frame.

In a fourth aspect of the invention, a method for secure communication of data between transmitting and receiving devices in a laser communication system using pulse position modulation, comprises the steps of: selecting a number N (where $N \geq 1$) of pulses to represent each symbol to be transmitted; selecting a pulse position format for each pulse of said N pulses of a synchronization symbol, such that each of said N pulses appears to be pseudo-randomly positioned within its frame; selecting a pulse position format for each pulse of said N pulses of each message symbol, such that each of said N pulses is pseudo-randomly positioned within its frame; selecting a trigger event to signal the start of a transmission; wherein said number of pulses, symbol formats, and trigger event being known by both transmitter and receiver; initializing a transmission with a trigger signal; transmitting a synchronization symbol having N pulses, in N sequential frames, one pulse per frame, to a receiving device immediately after a trigger event; receiving and storing the first frame of pulse data of said synchronization symbol in a buffer of said receiving device; and adding each subsequently received frame of pulse data of said synchronization symbol to pulse data previously stored in said buffer, such that the sum of said N frames is said synchronization pulse; calculating a frame template, from the stored pulse data of said first N pulses in said buffer and from said selected synchronization symbol format, for subsequent message symbols; and transmitting each subsequent message symbol in N frames per symbol, in said calculated frame template, the first of said frames of each message symbol being stored in said buffer, and subsequent frames being added to said stored data, such that the summed data in said buffer after receipt of said Nth frame of each message symbol represents the message symbol.

DESCRIPTION OF THE PREFERRED EMBODIMENT

This invention pertains to an optical communications system using Pulse Position Modulation (PPM) in which a number N of individual optical pulses are used to represent each transmitted symbol. Unlike the standard one pulse per symbol format, as is normally the case in PPM, the method of this invention requires N pulses to represent a symbol. The N received optical pulses in a symbol must be summed together in some manner to improve the effective SNR of the resultant summed pulse at the receiver to a level sufficient for accurate demodulation, that is, to a value sufficient to achieve decoding with a reasonable error rate. For this purpose, it is necessary to provide a method for generating a number of optical pulses based upon a single information symbol for the purposes of appropriately modulating a laser. For all examples in this specification, N is assumed to be 4. As will be discussed later, the value for N may, in fact, be virtually any number desired.

Figure 1:
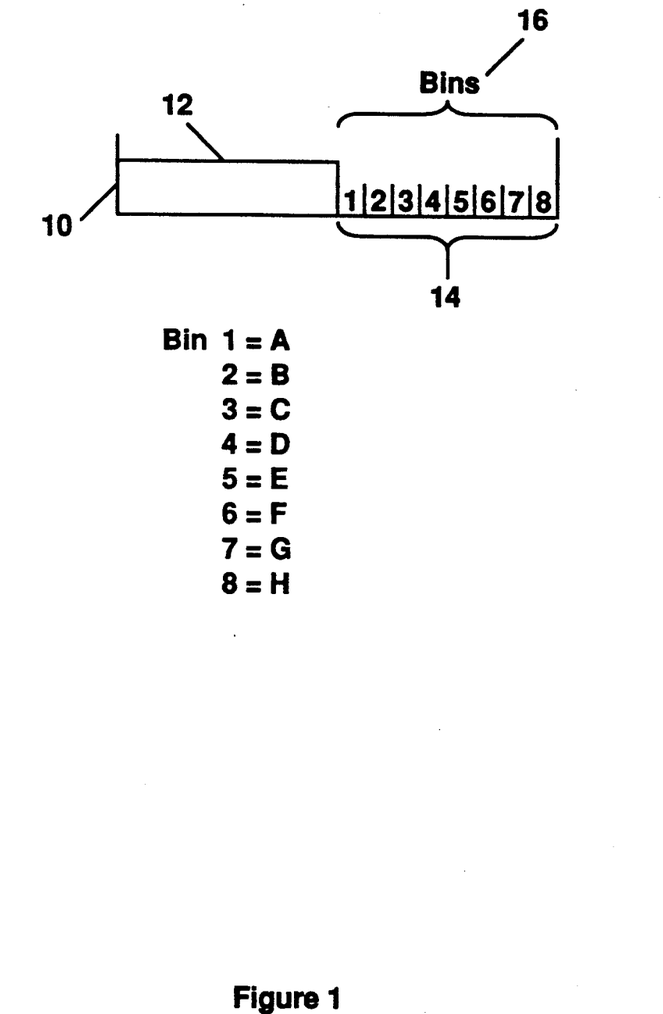
FIG. 1 is an illustration of a single optical pulse time frame, as used in the preferred embodiment of this invention.

FIG. 1 illustrates a single time frame 10, comprising a period of dead time 12, during which no optical pulse is transmitted, and a period of live time 14, during which an optical pulse may be transmitted. The live time 14 of each frame is further subdivided into a number of bins 16, each bin 16 comprising a number of clock cycles, and capable of containing a single optical pulse. Typically, only one pulse per frame is transmitted in Pulse Position Modulation, its significance being determined by the relative position of the bin in the frame in which it is transmitted. By definition, that pulse is transmitted in the middle of the bin 16. Since the method of this invention uses N optical pulses to represent each symbol, a group of N frames is required for transmission of each symbol.

For purposes of communications security, it is further desired that the optical pulses appear to be randomly located within their respective frames. This is because an interested third party could perform a simple averaging operation over windows of fixed size and recover the transmitted information almost as easily as the two communicating parties. Thus, the relative locations of the pulses within a symbol frame group and from symbol to symbol must vary in a manner which appears to be random to any third party. The manner in which this pseudo-randomization is achieved is discussed below in connection with the Synchronization Symbol Format and the Message Symbol Format sections of this specification.

In any communications system, some means must be provided for establishing communication initially. There are two general classifications for initialization procedures, cooperative and noncooperative. It can be shown that a noncooperative scheme is likely to be very difficult to implement as compared to a cooperative scheme. In addition, there are several cooperative schemes that would appear to interested third parties to be noncooperative. Since it can be shown that this later point is true, then, given the relative complexities involved, the cooperative approach will result in a practical, realizable system. Hence, the method of the present uses such a cooperative initialization mode.

In the noncooperative mode of operation, the demodulator must "see" the pulse stream without any a prior knowledge as to the time at which said stream began emanating from the modulator. To achieve this means: that the data stream must be self synchronizing and that the demodulator must be capable of detecting any of a number of possible character patterns (i.e., must search for a number of patterns simultaneously); or a synchronization symbol(s) must be periodically transmitted. If the first condition applies, the amount of hardware required quickly becomes prohibitive. Buffer memories on the order of a frame in length for each pattern to be searched plus the analysis hardware for each buffer, or hardware with sufficient speed to be used on multiple buffers, implies a large amount of power and board space. Another important drawback is the fact that if the patterns are in some sense self-synchronizing over the length of a message, then they are more easily detected by interested third parties.

If the technique of periodic transmission of synchronization pulses is used in a noncooperative (or cooperative) mode, then security is degraded by the extra time the transmitter is firing to transmit those extra synchronization symbol pulses. Also the message itself, or some recognizable portion thereof which could be the synchronization symbols, must be sent enough times (repetitively) to assure the link is established and that at least one complete message has been received. Additionally, the hardware requirements for this scheme are also sizable. In fact the amount of memory required can be an amount on the same order as the previous case. To be constantly looking for a specific pattern requires N buffers of a frame in size where N is approximately equal (though not necessarily equal) to the number of pulses in a symbol.

The amount of memory required in both of these cases for the noncooperative mode of initialization is proportional either to the number of patterns to be searched, which should be large to enhance security, or to the number of pulses per synchronization symbol, which could be large. The amount of hardware can be reduced to a relatively small, fixed amount, through the use of a cooperative link initiation scheme.

The cooperative mode of initialization works by timing both the transmit and receive ends of the uplink from a common reference point. If the demodulator knows within some small window of time when it will "see" the pulses of the first symbol and it knows what the pattern of the first symbol is, then it can start demodulating from the beginning of a message. This means that only one synchronization symbol need be sent for each individual message. Also, each message need only be sent once in the minimum case. The method of this invention utilizes such a common reference point, or trigger pulse, as will be explained with reference to FIG. 2.

Several events can be used as the triggering mechanism:

1) The normally receiving end of the communications link could transmit a pulse, or group of pulses, a trigger, to the normally transmitting end of the link. The round trip delay (which is the sum of the total photon travel time plus trigger processing time plus responding laser firing time) is generally calculable. The total time is not important. What matters is the time uncertainty. If this uncertainty is less than one-half (½) of the uplink frame dead time, the demodulator can uniquely decode the synchronization symbol pulse sequence.

2) If real Time Of Day (TOD) clocks are available to both the modulator and demodulator, and if the absolute time differential between these two clocks is within one-half (½) of the uplink frame dead time, then transmissions can occur on a scheduled basis.

3) If some third party (other than an eavesdropper) transmits a trigger signal to both the modulator and demodulator, then transmission can begin anytime following the trigger event up to the point at which the reference oscillators within the two communicating units drift too far apart in terms of clock cycle slips.

4) The modulator could first transmit a pulse or several pulses with sufficient SNR to allow the demodulator to achieve synchronization. This technique greatly degrades the security goal and is mentioned only for completeness.

Whichever technique is used, the demodulator is required to sum a single fixed pattern of pulses, as will be explained later in reference to FIG. 2. This, in turn, requires a single buffer memory whose size is determined solely by the incoming sample rate and the maximum frame length with which the system must operate. The amount of memory is not affected by the number of pulses in a symbol. Thus, assuming the following:

A) 15 MHz sampling rate, and:
B) 8 bit samples, and:
C) 100 mS maximum frame time, yields: 15e6*0.1=1.5 Mbytes of memory. This is 1% of the memory required by a comparable noncooperative system.

Figure 2:
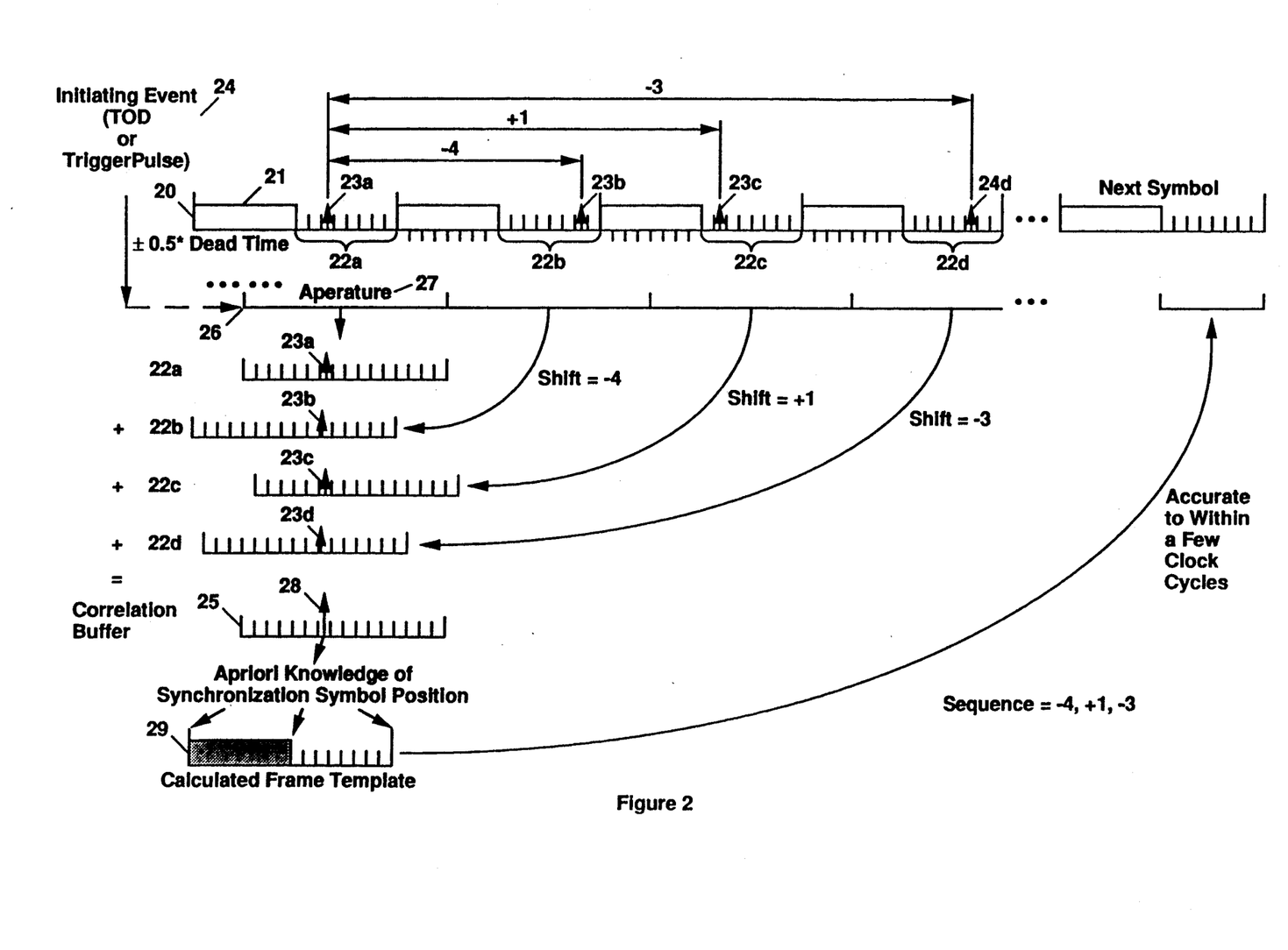
FIG. 2 is a diagrammatic representation of the format of a multiple-pulse synchronization symbol, illustrating the positions of its optical pulses within time frames as transmitted and their correlation for summing, according to the method of the present invention.

FIG. 2 is an exploded diagrammatic representation of the timing format of a multiple-pulse synchronization symbol, illustrating the positions of its N optical pulses within a group of N time frames as transmitted and the correlation of these N optical pulses for summing, according to the method of the present invention. Since N=4 in this example, FIG. 2 illustrates a group 20 of four frames 22a, 22b, 22c, and 22d, each of said frames containing a single pulse, the four pulses, shown as up-arrows 23a, 23b, 23c and 23d, representing one synchronization symbol. In the preferred embodiment of this invention, the synchronization symbol format, that is, the locations of each of said pulses within their respective frames, is known to both ends of the uplink. This synchronization symbol pattern (format) may change based upon some prearranged algorithm at some time interval. However, at any given time, the specific pattern used must be known to both ends of the communications link.

FIG. 2 also illustrates the synchronization acquisition technique for the multiple pulse/symbol modulation format, according to the preferred embodiment of the invention. The initiating event can be a trigger pulse 24, or an equivalent such as time of day (TOD), as discussed above, trigger pulse 24 being time-aligned as closely as possible to the center 26 of the dead time 21 of the first frame 22a of group 20 (with possibly a known, fixed offset). Trigger pulse 24 opens an aperture 27 during which the receiver looks for consecutive frames of pulse data. A fixed time after the trigger event 24, the demodulator begins storing data in its correlation buffer 25. Thus, the start of this storage process will also be time aligned as closely as possible to the center 26 of the dead time of the first frame, which is the beginning of aperture 27. This initial storage will continue for one full frame, 22a. At the end of this time, data for the second frame 22b is beginning to be received. However, since the synchronization symbol format is known by the receiving end of the link, the receiver also knows that pulse 23b, which will appear in the second frame 22b, has been shifted by a known offset from the position of pulse 23a already received in the first frame 22a. In the illustration of FIG. 2, the sequence of offsets used for the second, third and fourth frames is −4, +1, and −3 respectively, calculated from the opening of aperture 27 at the center of dead time 26 of frame 22a. Therefore, the data (pulse 23b) in the second frame 22b is added to the stored data (pulse 23a) in the correlation buffer 25 from the first frame 22a, with a time shift equal to the relative time shift of the two pulses. Subsequent frames are added to this sum in like manner, until N frames have been received and added. In the exploded timing diagram of FIG. 2, frames 22a-22d are shown in alignment with the first frame of aperture 27 and correlation buffer 25, the alignment of frames 22b-22d being adjusted for the offsets from frame 22a. This diagrammatic representation shows that pulses 23a-23d are then aligned for summing. The resultant summed pulse 28 in correlation buffer 25 is the synchronization symbol.

At the end of the last synchronization frame, the summing buffer 25 should contain what amounts to a reconstructed version of a frame that might have been transmitted if the link were operating in a single pulse/symbol mode. However, this frame is bounded not by the transmitted frame boundaries, but by the boundaries of the local buffer 25. The composite pulse 28 that resulted from the summing operation was known to represent a real pulse whose absolute position in a real frame is known to the demodulator. A calculated frame template 29, which is a reconstructed version of the first frame of the originally transmitted group 20 of frames, can now be developed. Further, since by definition the transmitter always transmits a pulse in the center of a bin, this calculated frame template 29 is accurate to within the ability of the demodulator to determine the center of the pulse.

If the number of pulses per symbol is large enough, or the sampling rate is sufficiently low, software would be able to determine this position, i.e. the center of the pulse, to within a few clock cycles. If, on the other hand, such is not the case, data reduction via peak detection and Time of Arrival (TOA) of the detected peaks can be used to reduce the effective data rate. If the latter is the case, then the accuracy of determining pulse position is reduced to some fraction of the pulse width.

As the distance from the boundaries of the reconstructed frame 29 to the summed pulse 28 can be determined, and the distance from the summed pulse 28 to the boundary of summing buffer memory 25 can be determined, the offset of aperture 27 can be calculated. This offset is calculated to the same degree of accuracy as the center of the bin containing the summed pulses was previously calculated. This capability is important, because it determines the setting of the message pulse search aperture described in the following paragraphs.

It is important to note that the synchronization pulse decoding may be done in a maximum likelihood manner, rather than with threshold decoding.

Figure 3:
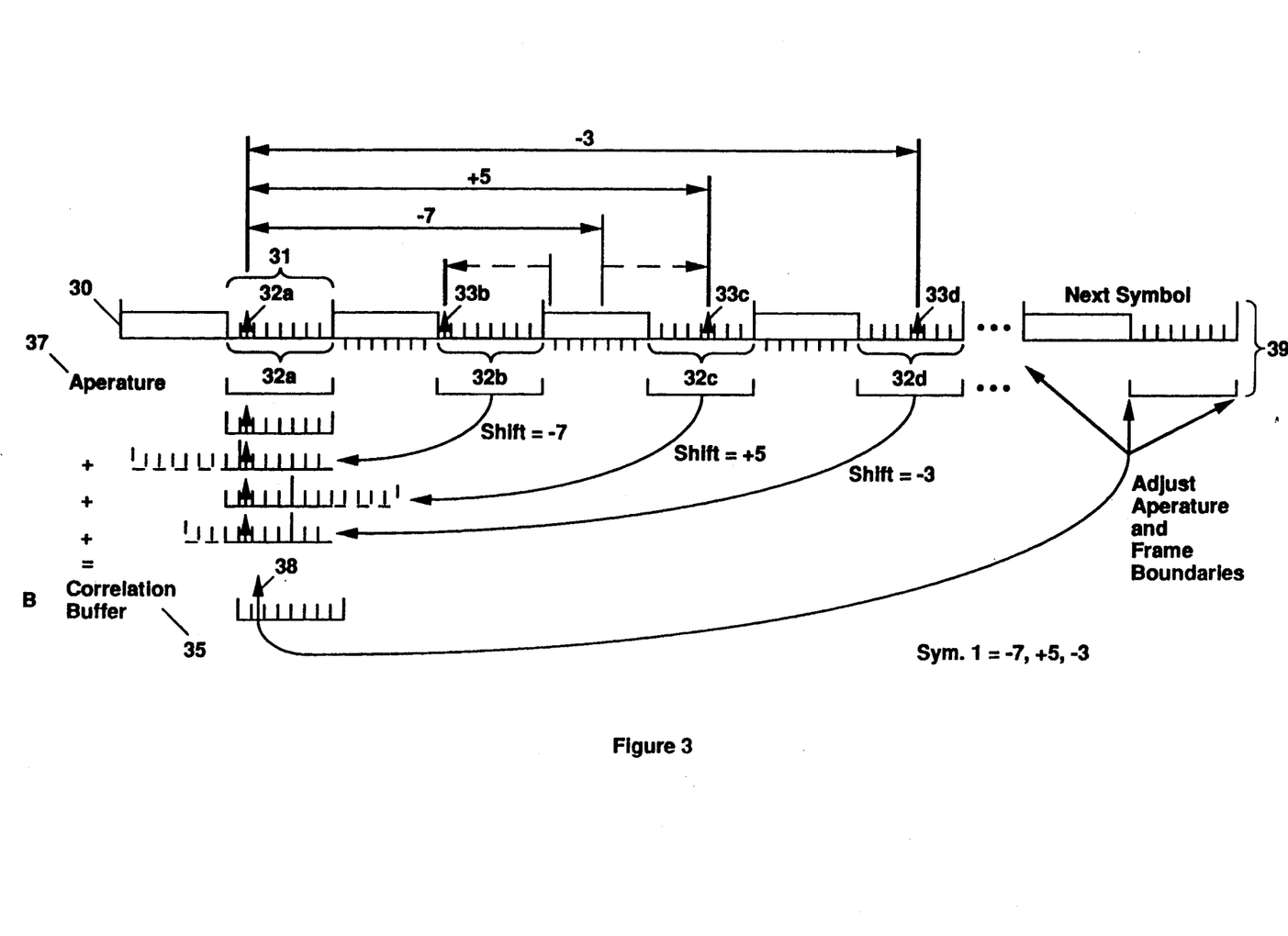
FIG. 3 is a diagrammatic representation of the format of a multiple-pulse message symbol, illustrating the positions of its optical pulses within time frames as transmitted and their correlation for summing, according to the method of the present invention.

FIG. 3 is an exploded diagrammatic representation of the timing format of a multiple-pulse message symbol, illustrating the positions of its N optical pulses within a group of N time frames as transmitted and the correlation of these N optical pulses for summing, according to the method of the present invention. Since N=4 in this example, FIG. 3 illustrates a group 30 of four frames 32a, 32b, 32c, and 32d, each of said frames containing a single pulse, the four pulses, shown as up-arrows 33a, 33b, 33c and 33d, representing one message symbol. The message symbol format of FIG. 3 at first glance appears to be identical with the synchronization symbol format of FIG. 2. However, unlike the fixed pulse locations in the synchronization symbol format, the message symbol is defined by the following set of rules:

1) The separations between pulses in a symbol are known to both ends of the communications link.
2) These separations vary from pulse to pulse within a symbol.
3) The separations are algorithmically determined by an algorithm available to both ends of the communications link. This sequence is referred to as the symbol pattern.
4) The symbol patterns vary from symbol to symbol.
5) The sequencing of the symbol patterns is algorithmically determined.
6) The sequencing algorithm is known to both ends of the communications link.
7) The location of the first pulse of a symbol within its frame determines the value of that symbol.
8) If, due to the location of the first pulse of a symbol, any subsequent pulse within that same symbol should be determined to need to be generated in the dead time of a frame of yet a third pulse, the out of bounds pulse will be generated in its own associated frame's live time in a location determined by the following formula:

New location=(Location of first pulse+Pulse separation value) modulo live time size in bins.

Following the rules given above, and by choosing a suitable algorithm for pulse pattern generation, an apparently random pulse pattern containing a decodable structure will result.

The exploded timing diagram of FIG. 3 also illustrates the process of message pulse decoding. Though similar to synchronization pulse decoding, there is one major difference. The pulse search aperture 37 is open only for the live time 31 of each frame 32a–32d. This is required because, given the rules previously listed, the absolute offsets of message symbol pattern generation between pulses 33a–33d are not always known. What is known is their offset modulo the live time in numbers of bins. Thus, in contrast to synchronization pulse summing, message pulse summing proceeds using wrap around of the incoming data into the summing buffer 35. The dotted line sections of frame live times 31 shown in FIG. 3 represent this modulo operation.

Without discussing the mathematical considerations involved, the pulses 33a–33d again align in the summing buffer 35, thus enabling the reconstruction of a summed pulse 38 representing the specific character sent. Since the pulse position within the summing buffer 35 can be determined, and the boundaries of buffer 35 align with the live times 31 of the frames 32a–32d, the absolute position of the summed pulse 38 in the reconstructed, i.e. calculated, frame template 39 can be determined, thus yielding the transmitted symbol.

Figure 4:
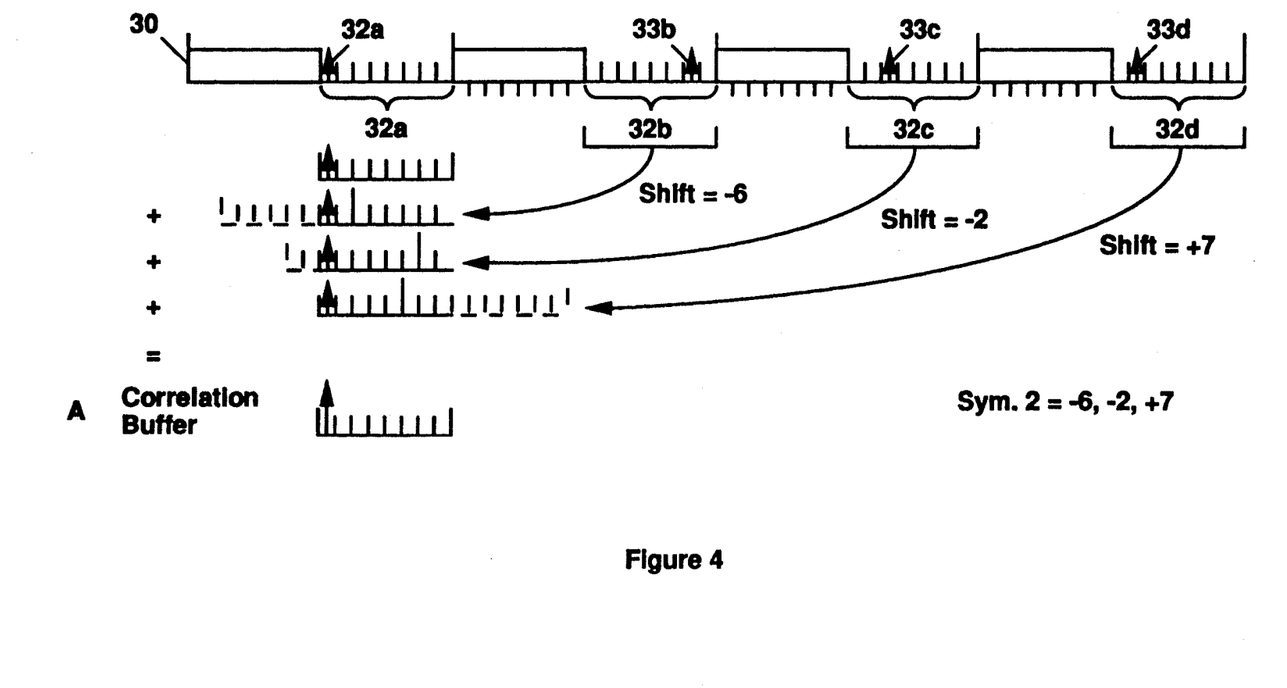
FIGS. 4 and 5 are exploded timing diagrams for two additional message symbols, according to the format of FIG. 3.
Figure 5:
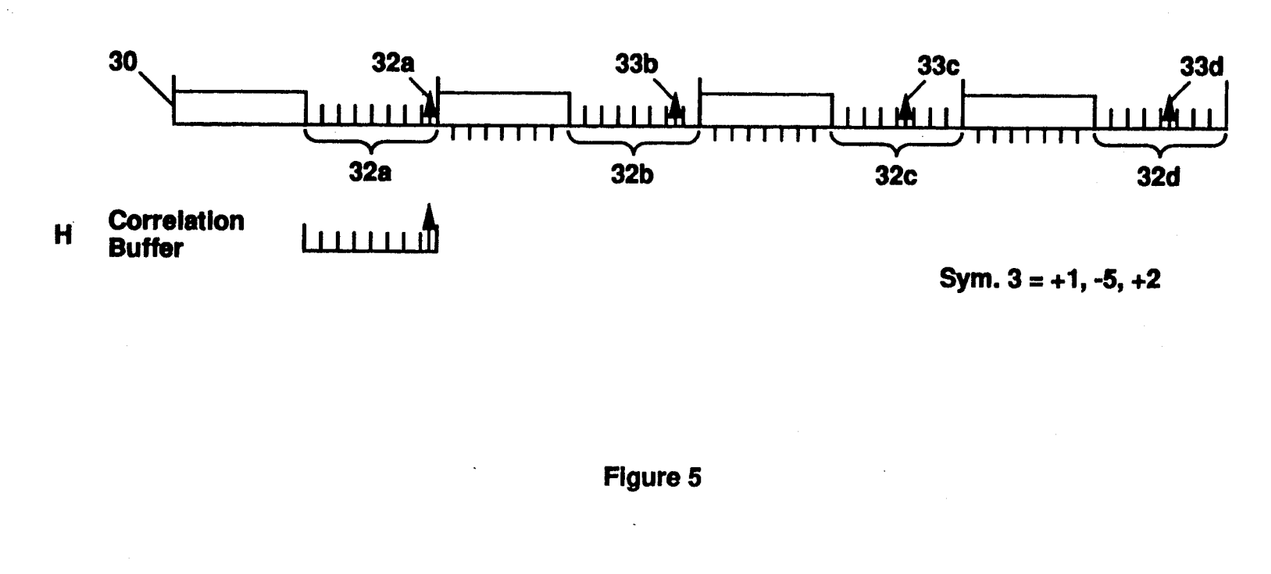

Referring back to FIG. 1, therein each of the eight bins 16 represents one of the letters A through H. Thus, the message symbol in FIG. 3 is B. FIGS. 4 and 5 present the timing diagrams for two additional message symbols A and H.

A few other points are derived from this decoding scheme. First, this demodulation method involves maximum likelihood with a possible addition. If the number of pulses per symbol is large enough, sufficient processing can take place to compare the relative quality of several of the largest pulses in the reconstructed frame. As an example, suppose there appear two pulses of close to equal magnitude in a frame. In normal maximum liklihood decoding, the largest pulse would be declared the correct one and that would be that. However, if the largest pulse were not bin centered (possibly even straddling two bins), and the second largest pulse was bin centered, then there is some probability that the bin centered pulse is in fact the correct one. This probability is dependent upon the offset of the questionable pulse from the center of its best fit bin.

A second ramification of this decoding process is that link synchronization can be maintained without the periodic use of a synchronization signal. The first synchronization symbol is required to yield an initial point of reference. However because, by definition, the transmitter always places pulses in the center of their bins, then the decoder can use this information to adjust the message pulse search apertures depending upon the apparent offset of the reconstructed pulse from a bin center. If the setability of the two modulator/demodulator master clocks is sufficiently fine, then the drift between them can be kept to a low enough level across a symbol that the aperture-to-aperture starting adjustments need not be very great, For example, given:
A) Frame size=100 mS
B) Pulses per symbol=100
C) Clock frequency=15 MHz The drift of one clock cycle=1/15e6=67 nS. The symbol time=0.1*100=10 seconds. Thus, the setability required to maintain drift between the two clocks must be at least=67e−9(10*2)=3.3e−9. This is a value available in a number of ovenized crystal oscillators.

I claim:

1. A system for secure communication between transmitting and receiving devices in a laser communications system using pulse position modulation, comprising:
    means to modulate and demodulate a transmission utilizing a protocol in which a number N (N≧1) of pulses represents each symbol to be transmitted;
    means to initiate a transmission with a trigger event;
    means to transmit a multi-pulse synchronization signal as the first symbol of each transmission, the first pulse of said synchronization symbol being transmitted within a first time frame after said trigger;
    buffer means in said receiver to receive and store the first of said N frames of said synchronization symbol;

means to add each subsequently received frame of said N frames of said synchronization symbol to data previously stored in said buffer;

means to calculate a frame template from the stored pulse data of said first N pulses in said buffer and from said synchronization symbol protocol, for transmission of subsequent message symbols;

means to transmit each subsequent message symbol in N frames per symbol, in said calculated frame template, the first of said frames of each message symbol being stored in said buffer, and subsequent frames being added to said stored data, such that the summed data in said buffer after receipt of said Nth frame of each message symbol represents the message symbol.

2. The system of claim 1 wherein said synchronization symbol protocol further comprises:

a synchronization symbol format known to both transmitter and receiver; and an algorithm for pseudo-randomly positioning each of said N−1 pulses after said first pulse within its frame by offsetting the start time of its frame by a predetermined amount of time, with reference to the start time of said first frame.

3. The system of claim 1 wherein said message symbol protocol further comprises:

a message symbol format known to both transmitter and receiver; and an algorithm for pseudo-randomly positioning each of said N−1 pulses after said first pulse within its frame by offsetting its pulse position from that of said first frame such that the separations of said pulses vary from frame to frame within a symbol, and said algorithmically determined position of any pulse falls within the live time of its frame.

4. The system of claim 1 wherein said means to transmit said symbols further comprises:

means to reduce transmitter power so that the SNR of transmitted pulses approximates the background noise of the communication channel.

5. A method for secure communication of data between transmitting and receiving devices in a laser communications system using pulse position modulation, comprising the steps of:

selecting a number N (N≧1) of pulses to represent each symbol to be transmitted;

selecting a pulse position format for each pulse of said N pulses of a synchronization symbol, such that each of said N pulses appears to be pseudo-randomly positioned within its frame;

selecting a pulse position format for each pulse of said N pulses of each message symbol, such that each of said N pulses is pseudo-randomly positioned within its frame;

selecting a trigger event to signal the start of a transmission;

said number of pulses, symbol formats, and trigger event being known by both transmitter and receiver;

initializing a transmission with a trigger signal;

transmitting a synchronization symbol having N pulses, in N sequential frames, one pulse per frame, to a receiving device immediately after a trigger event;

receiving and storing the first frame of pulse data of said synchronization symbol in a buffer of said receiving device;

adding each subsequently received frame of pulse data of said synchronization symbol to pulse data previously stored in said buffer, such that the sum of said N frames is said synchronization pulse;

calculating a frame template, from the stored pulse data of said first N pulses in said buffer and from said selected synchronization symbol format, for subsequent message symbols; and transmitting each subsequent message symbol in N frames per symbol, in said calculated frame template, the first of said frames of each message symbol being stored in said buffer, and subsequent frames being added to said stored data, such that the summed data in said buffer after receipt of said Nth frame of each message symbol represents the message symbol.

6. The method of claim 5, wherein the step of selecting said synchronization symbol format further comprises:

selecting an algorithm for pseudo-randomly positioning each of said N−1 pulses after said first pulse within its frame by offsetting the start time of its frame by an algorithmically determined amount of time, with reference to the start time of said first frame.

7. The method of claim 5, wherein the step of selecting said message symbol format further comprises:

selecting an algorithm for pseudo-randomly positioning each of said N−1 pulses after said first pulse within its frame by offsetting its pulse position from that of said first frame such that the separations of said pulses vary from frame to frame within a symbol by an algorithmically determined pattern, and said algorithmically determined position of any pulse falls within the live time of its frame.

8. The method of claim 5, wherein the step of initializing a transmission with a trigger signal further comprises the steps of:

recognizing said trigger signal at both ends of the communications link;

initiating the transmission of a synchronization signal by the transmitter within the first time frame following said trigger signal; and receiving and storing in a buffer at the receiver all signals within said first frame following said trigger symbol.

9. The method of claim 5, wherein the step of transmitting a synchronization symbol further comprises the step of:

reducing the transmitter power so that the SNR of the transmitted pulse approximates the background noise of the communication channel.

* * * * *